Jan. 26, 1960   R. HIGONNET ET AL   2,922,508
INDICATING MEANS FOR TYPE COMPOSITION
Original Filed Aug. 23, 1947   4 Sheets-Sheet 3

INVENTORS.
Rene Higonnet & Louis Moyroud.
BY KENWAY, JENNEY, WITTER & HILDRETH
Attys

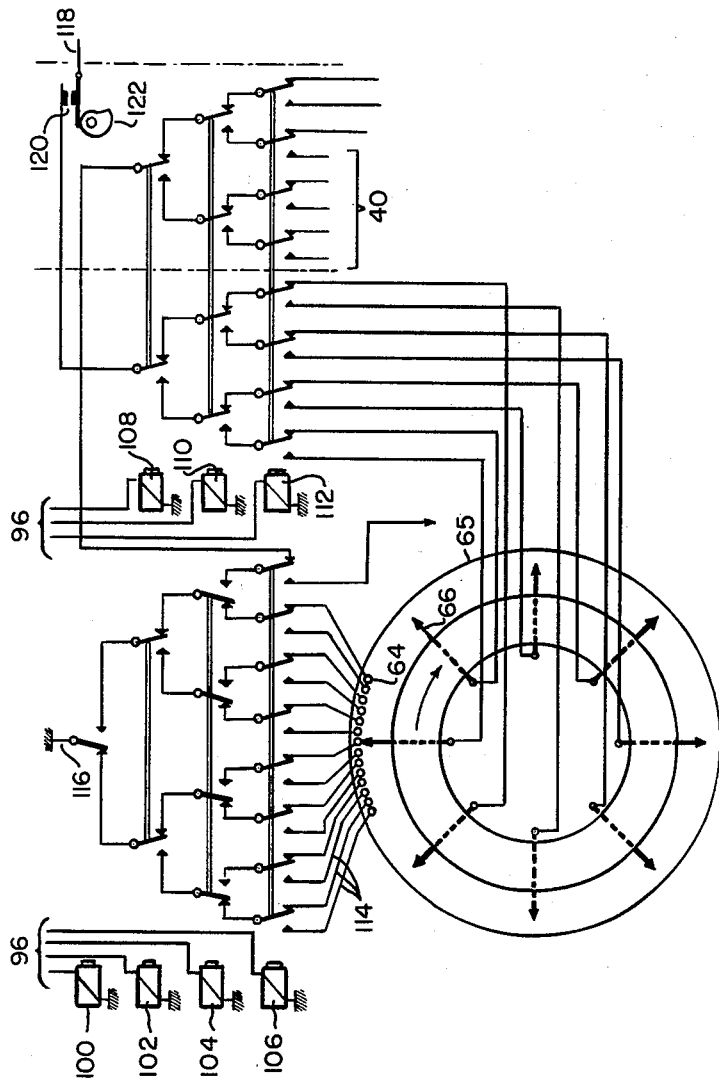

United States Patent Office 2,922,508
Patented Jan. 26, 1960

2,922,508

INDICATING MEANS FOR TYPE COMPOSITION

Rene Higonnet, Cambridge, and Louis Moyroud, West Medford, Mass., assignors to Graphic Arts Research Foundation, Inc., Cambridge, Mass., a corporation of Delaware Original application August 23, 1947, Serial No. 770,320, now Patent No. 2,790,632, dated April 30, 1957. Divided and this application March 7, 1957, Serial No. 644,642

Claims priority, application France March 20, 1947

6 Claims. (Cl. 197—157)

The present invention relates generally to type composing apparatus having multiple fonts, and more particularly to means for visually indicating the font selected by the operator. This application is a division of our copending application Serial No. 770,320, filed August 23, 1947, now Patent No. 2,790,632, issued April 30, 1957.

An object of the invention is to provide means for indicating visually which font of a plurality of available fonts in the composing machine is selected when the characters are composed.

With the above and other objects in view, we provide a photographic type composing machine having a continuously rotating drum which carries a multi-font master character stencil. There is a row of characters for each font, and the drum is shifted longitudinally to place any selected row opposite a projection lens. The characters are selected at a keyboard on a non-justifying typewriter which enables the operator to check the characters visually as they are selected. Coded information corresponding to the selected characters is also entered in a register. Along with this information, additional information is entered to indicate the selected font. The stored information is later sensed and decoded. The decoded information corresponding to the character is used to control the energization of a flash device at the moment when each selected character is in projection position. The decoded information corresponding to the font is used to control a drum shift mechanism.

According to an important feature of the invention, we provide a multiple color type ribbon for the non-justifying typewriter, each color to represent a different font on the drum. The selection of the font by the operator is arranged to actuate a ribbon shift mechanism directly, as well as to enter corresponding information in the register as previously stated.

Other features of the invention reside in certain details of construction and arrangements of the parts which will be evident from the following description of a preferred embodiment thereof, having reference to the appended drawings illustrating the same, in which Fig. 1 is a block diagram of that portion of the machine having to do with font selection;

Fig. 5 is a circuit diagram of the decoder.

*Block diagram*

Figure 1:
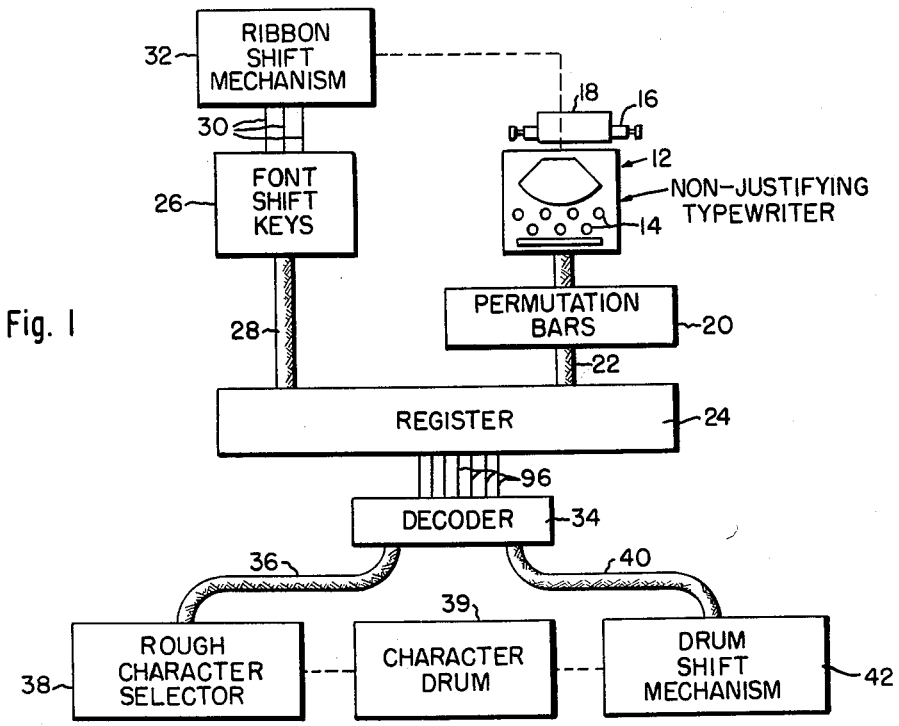

Referring to Fig. 1, a non-justifying typewriter 12 is provided with a keyboard 14 and the usual platen carriage 16 over which a sheet of paper 18 is inserted. The keys are connected with permutation bars 20 as described in said application, whereby for each depressed key, a combination of seven wires in a cable 22 is energized, this combination comprising a code representing the particular character. The code for each selected character is stored in a register 24 comprising a number of rows and columns of depressable pins, as described in detail in said application.

The register 24 also receives code information from a set of font shift keys 26, these keys being connected with the register as indicated at 28. The font shift keys are also connected by three wires 30 with a ribbon shift mechanism 32. The ribbon shift mechanism determines the color of the character that is typed on the sheet 18.

The coded information corresponding to characters and fonts is stored in the register 24 a line at a time. When the line is ready for transcription, the information is read into a decoder 34. The decoder determines whether a particular code relates to character selection or to a change of font. Appropriate wires in a cable 36 leading to a rough character selector 38 are energized. The rough character selector is mechanically associated with a character drum 39 and determines the moment when the selected character on the drum is in projection position since, as previously indicated, the characters are continuously moved through this position during the operation of the machine. If the decoded information relates to a change of font, appropriate connections through a cable 40 are made to a drum shift mechanism 42 fully described in said application. The drum shift mechanism determines the longitudinal position of the rows of characters on the drum 39 in relation to the projection position.

It will thus be seen that selection of a font shift key has two functions: first, to enter an appropriate code in the register 24, and second, to operate the ribbon shift mechanism 32, thereby causing the characters subsequently selected to appear in a corresponding color upon the copy sheet 18. Details of the operation of the drum shift mechanism 42 from the coded information stored in the register 24 are fully described in said application.

*Photographic unit*

Figure 2:
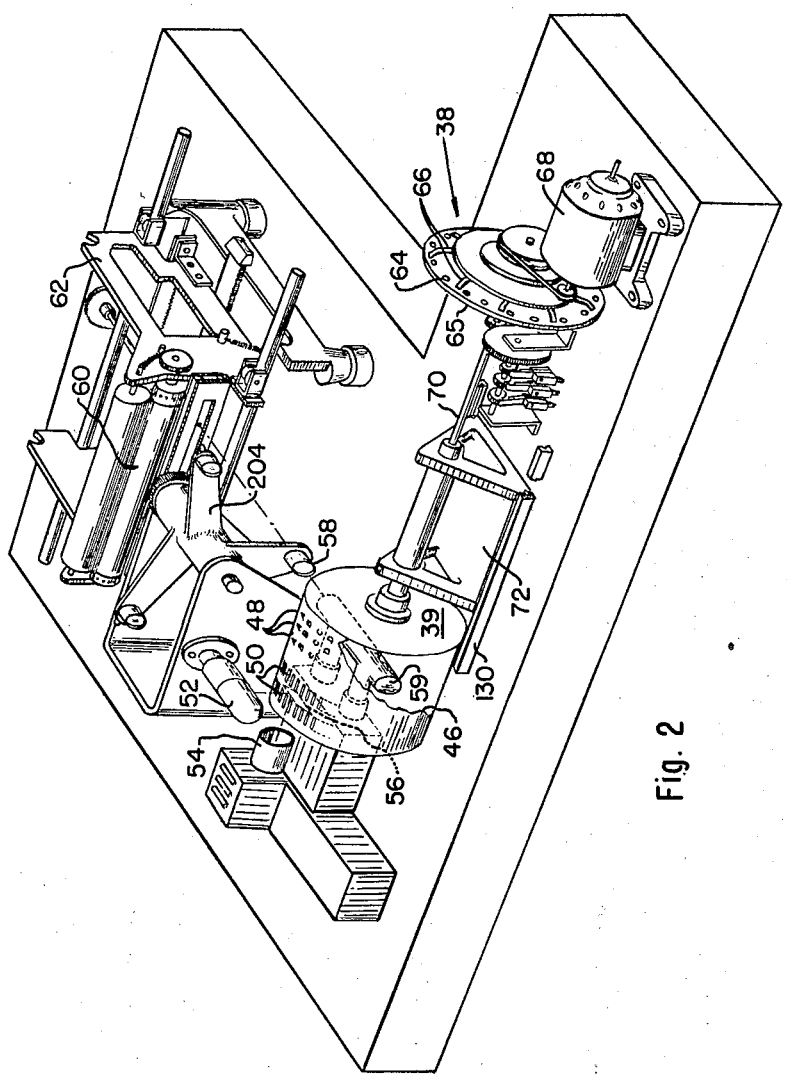
Fig. 2 is a view in perspective showing the character drum.

The character selector 38 and drum shift mechanism 42 are mechanically associated with the character drum 39 as shown in Fig. 2. The drum may be constructed of transparent plastic. As described in said application, a master character sheet 46 is wrapped over the surface of the drum. A number of such sheets may be made available for use on the machine alternatively. The sheet 44 may be opaque except for a number of rows 48 of characters, each row containing a different font, and a similar number of rows 50 of transparent slits. The purpose of the slits is to generate light impulses whenever a character on the master sheet passes in photographic position, as described in said application. It will suffice for present purposes to say that a photocell 52 is arranged opposite one of the rows 50 with a light source 54 disposed so as to project light to a reflector 56 within the cylinder, the reflected light striking the photocell 52 each time the beam is intercepted by a slit. There is a slit for each character of the row 48 disposed opposite a projection lens 58, whereby a photoelectric impulse is generated by a slit at the precise moment when its corresponding character is in projection position opposite the lens 58. An intermittent flash device 59 is energized only when a photoelectric impulse occurs during the period when the character selector 38 is operated, as fully shown and described in said application. The image of the selected character illuminated by the flash device is projected onto a sensitized sheet 60 supported on a film carriage 62. The carriage is arranged for variably spacing the characters in a line as well as for line spacing, The selection of the desired character for projection is accomplished by the rough character selector 38 which includes an array of terminals 64 on a stationary disk 65 and a plurality of brushes 66 adapted to be revolved by a motor 68 which also rotates the drum 39. The brushes 66 are secured to a shaft 70 revolved by the motor 68. The drum is mounted on a carriage 72 for longitudinal translation in accordance with the font selected.

Register

Figure 4:
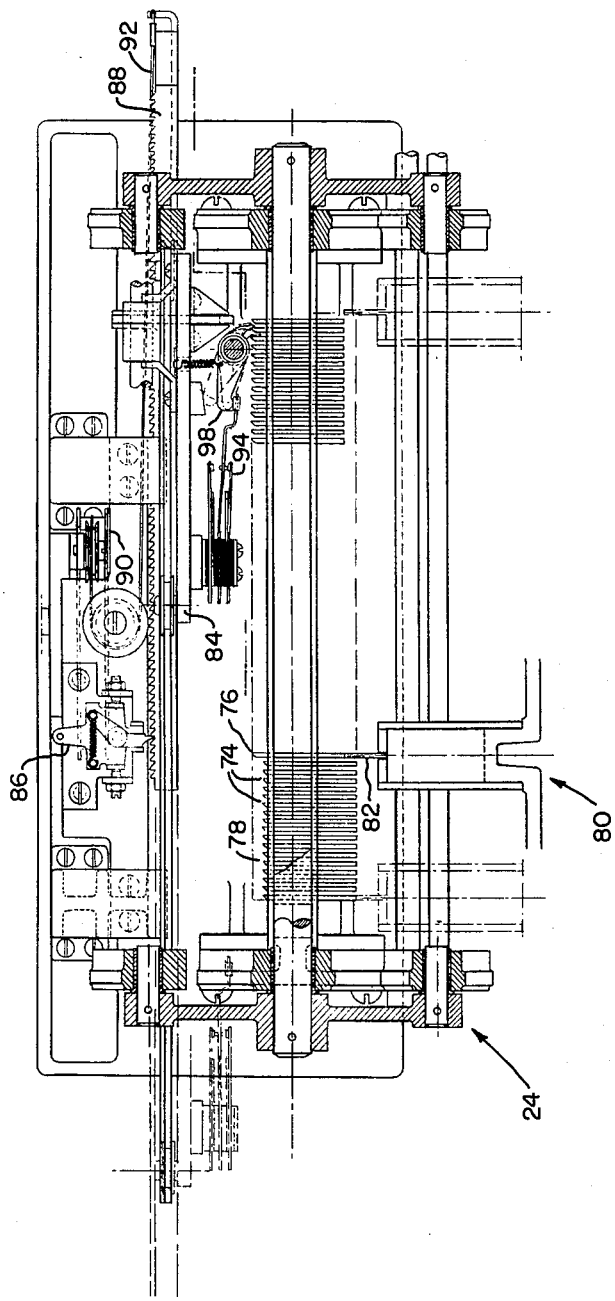
Fig. 4 is a partial plan view of the register.

As previously indicated, the typing of selected characters at the keyboard 12 causes energization of corresponding combinations of seven leads in a cable 22 leading from the permutation bars 20 to the register 24. The register structure is more fully described in said application, but its operation may be ascertained for present purposes from Fig. 4 which is a plan view thereof. There is provided a flat support having a number of rows and columns of depressable pins 74. Each pin may be moved independently to either of two stable positions, an "actuated" position as indicated at 76 and an "unactuated" position as indicated at 78. Assuming that the field of pins is oriented in a vertical plane, a hammer carriage 80 is supported on one side of the field, and is provided with a vertical column of seven hammers 82 adapted to align with the pins a column at a time. The seven hammers 82 are energized through the leads in the cable 22. After each character is selected, the hammer carriage 80 is advanced to the next column as described in said application.

On the other side of the field of pins 76 is supported a reading carriage 84. This carriage is moved one step at a time independently of the hammer carriage 80 by actuation of an escapement mechanism 86 cooperating with a rack 88 rigidly connected to the carriage 84 and constantly urged by a spiral spring enclosed in a casing 90, the spring acting on a cord 92 through deflecting rollers. A series of seven contacts 94 arranged in a vertical column cooperate with the decoder 34, being connected thereto by corresponding leads 96. These contacts are mounted on the carriage 84 and are actuated by feelers 98 each provided with a tail which is rocked when it meets on its path a protruding pin, that is to say, a pin in the "actuated" position.

Since the present invention is not concerned with the details of the construction of the register, reference is merely made to the above-mentioned application, the description of which is incorporated herein by reference.

Decoder

Referring to Fig. 5, it will be seen that the leads 96 from the register are connected with a corresponding set of seven decoder magnets 100 to 112. The reading carriage 84 advances step by step and thus energizes the relays of the decoder in successive code combinations corresponding to the letters of the stored line. The flashing of the characters through the control of the decoder relays is controlled so that it can occur only during alternate cycles of the master drum. The carriage 84 is stepped during opposite alternate cycles of the drum, during which no photography occurs.

The relays 100 to 112 are provided with fanning-out contacts leading to a number of wires 114, each wire being connected with an individual terminal 64. The contacts of the relays 100 to 106 are connected with a ground connection 116, while those of the relays 108, 110 and 112 are connected with the brushes 66. An output lead 118 may thus be grounded through contacts 120 operated by a timing cam 122, contacts of the relays 108, 110 and 112, the brushes 66 and contacts 64, contacts of the relays 100 to 106, and the connection 116. The ground on the output lead 118 occurs at a selected moment depending upon the combination of the relays 100 to 112 that is energized, this combination causing the ground to occur during the time interval when the selected character is in projection position. The connection of the lead 118 to the flash control circuit and the details of the controls thereof are fully described in said application.

As has been previously explained, the font of the characters is also controlled by a code combination recorded in the register. At the decoding stage, when a registered code combination corresponding to a change of font is read, the relays 100 to 112 are energized in an appropriate combination to connect the ground 116 with one of the group of leads 40. This code combination is registered in a separate column of pins and controls the font of the characters in the following columns, until a new font change combination is reached.

Font indicator

Figure 3:
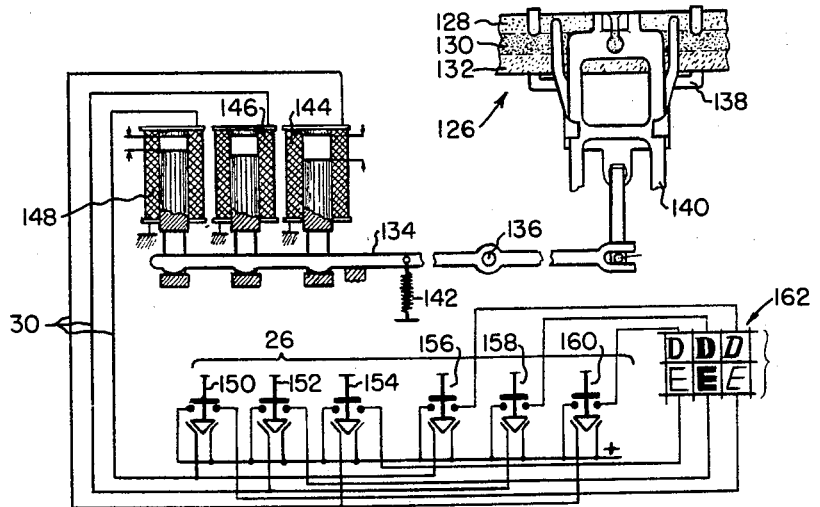
Fig. 3 is a diagrammatic view showing the apparatus for visual indication of the font selected.

In order that the operator may be informed at all times of the font change code most recently registered, the color band of the typewriter ribbon 126 selected to cooperate with the type bar (Fig. 3) is arranged to accord with the code designation last reaching the decoder. Thus the ribbon may have one color band 128 for roman type, another color band 130 for bold face and a third color band 132 for italics. This arrangement may also be used to distinguish between styles such as Garamond, Didot or Cheltenham. A group of six keys 26 are connected with the register and record the code combination which is allocated to each. The connection from the contacts of the keys 26 to the register 24 is indicated in Fig. 1 at 28. Upon depression of a given key, a combination of pins in the register is depressed, these pins being arranged to cause the decoder to ground an appropriate lead of the group 40 when the pins are reached by the reading carriage 84.

Preferably, the keys 26 are provided with a device, not shown, so that only one key can be operated at a time.

The operation of the ribbon shift mechanism is as follows. The upper band 128 of the ribbon representing roman type is black. The band 130 representing bold type is red. The band 132 representing italics is violet. The various colors are selected by means of a lever 134 pivoted about an axis 136. The lever 134 is attached to a sliding member 138 which slides in a fixed member 140, the member 138 retaining the ribbon 126. A spring 142 constantly urges the lever 134 in one direction. The lever may assume any one of three different positions according to which of three magnets 144, 146 or 148 is energized. Font shift keys 150 to 160 are arranged in two groups of three keys each: the keys 150, 152 and 154 representing italics, bold face and roman, respectively, of the "Didot" font; and the keys 156, 158 and 160 representing italic bold face and roman in the "Cheltenham" font. The pairs of keys representing italics, bold face and roman type are connected in parallel, whereby the same electromagnet is energized whether the "Didot bold" or "Cheltenham bold" key is depressed, for example. At 162 is shown an indicator panel on which the operator may check what font of characters he has selected. The upper row of this panel represents Cheltenham fonts and the lower row represents Didot fonts. While the ribbon distinguishes between italics, bold face and roman type, the indicator panel 162 makes the further distinction between Didot and Cheltenham fonts. The information transmitted by means of the connection 28 (Fig. 1) to the register 24 includes all of the information visually indicated by the panel 162.

When, for instance, the key 152 representing "Didot bold" is actuated, a battery current is applied to the electromagnet 146 which pulls its plunger and lifts the lever 134 to its intermediate position. The ribbon 126 is therefore pulled down and presents its red portion 130 opposite the type bars of the typewriter. The key 152 is constructed so that it remains in its depressed position, and lights a lamp behind the lower middle window of the indicator panel 162.

By the foregoing means, we have provided apparatus for visual indication of a font selected from a number of fonts available in the machine, whereby the operator can readily ascertain the font in which the characters will be composed until a suitable signal is sent from the keys 26 to the register 24 to introduce a different font.

It will be understood that the designations associated with the various colors of the ribbon are a matter of choice, and that the designations described above are merely used by way of example.

Having thus described the invention, we claim:

1. A photographic type composing machine comprising, in combination, a master character drum provided with a plurality of sets of master characters of different fonts, a register with means to set up code combinations corresponding to the said sets of characters, means actuated by said code combinations for controlling the displacement of said drum to select a font, a typewriter and font selector means operative upon the register for controlling the composition of each line of text, ribbons of different colors for the typewriter, and means operated by the font selector means to select one of said color ribbons corresponding to a selected font of characters, whereby the operator can check at any moment the font of characters he is using.

2. A type composing machine having, in combination, a typewriter, font selector means to select any one of a plurality of fonts for composition, a ribbon for the typewriter having a plurality of bands each of a distinct color corresponding to one of said fonts, a variable motion device adapted to present any one of said colors in typing position, a register actuated by the typewriter and font selector means having means to set up a distinct code corresponding to each character and each of said fonts, the typewriter being adapted to type each character as it is entered in the register, and means controlled by the font selector means to cause the variable motion device to present the color corresponding to a selected font.

3. A photographic type composing machine having, in combination, a master character drum having a number of bands of characters thereon, each band having a different font, a typewriter having keys for selection of the characters in a line of text and font selector means, a register controlled by the keys and font selector means with means to set up a code corresponding to each selected character and each new font selection, means actuated by the register for controlling the displacement of the drum to select a font, and a device controlled by the font selector means to vary the color of a selected character as type on said typewriter according to the font selected.

4. A type composing machine having, in combination, a typewriter having character keys and a plurality of font keys thereon, a multicolor ribbon having a color for each of a plurality of fonts and associated ribbon shift mechanism for the typewriter, a register to store information corresponding to the character and font keys selected, the typewriter being adapted to type each character as it is entered in the register, means controlled by the font keys to operate the ribbon shift mechanism to present a color corresponding to a selected font for typing, and transcribing means operable by the register to transcribe the selected characters including a support for a plurality of fonts of characters and means operable by font information in the register to select a corresponding font on the support for transcription.

5. A type composing machine having, in combination, a typewriter, font selector means to select any one of a plurality of fonts for composition, the typewriter having means to type the characters in a plurality of colors each corresponding to a font, mechanism adapted to cause characters struck on the keyboard to be typed in a selected color, a register actuated by the typewriter and font selector means having means to set up codes corresponding to the characters and fonts, the typewriter being adapted to type each character as it is entered in the register, and means controlled by the font selector means and operative on said mechanism to cause a selected character to be typed in the color corresponding to a selected font.

6. A type composing machine having, in combination, a typewriter having manually operable character keys and a plurality of manually operable font keys thereon, a multicolor ribbon having a color for each of a plurality of fonts and associated ribbon shift mechanism for the typewriter, a register to store information corresponding to the character and font keys operated, the typewriter being adapted to type each character as it is entered in the register, and means controlled by the font keys to operate the ribbon shift mechanism to present a color corresponding to a selected font for typing.

References Cited in the file of this patent

UNITED STATES PATENTS

| | | |
|---|---|---|
| 1,584,744 | Hexter | May 18, 1926 |
| 2,319,036 | Burcky | May 11, 1943 |

UNITED STATES PATENT OFFICE

CERTIFICATE OF CORRECTION

Patent No. 2,922,508            January 26, 1960

Rene Higonnet et al.

It is hereby certified that error appears in the above numbered patent requiring correction and that the said Letters Patent should read as corrected below.

In the heading to the printed specification, line 10, and column 1, line 21, for the patent number "2,790,632", each occurrence, read -- 2,790,362 --.

Signed and sealed this 2nd day of August 1960.

(SEAL)
Attest:
KARL H. AXLINE
Attesting Officer

ROBERT C. WATSON
Commissioner of Patents